May 26, 1931.  F. ANGERSTEIN  1,807,143
INDUCTION MOTOR CONTROL SYSTEM
Filed April 14, 1927   2 Sheets-Sheet 1
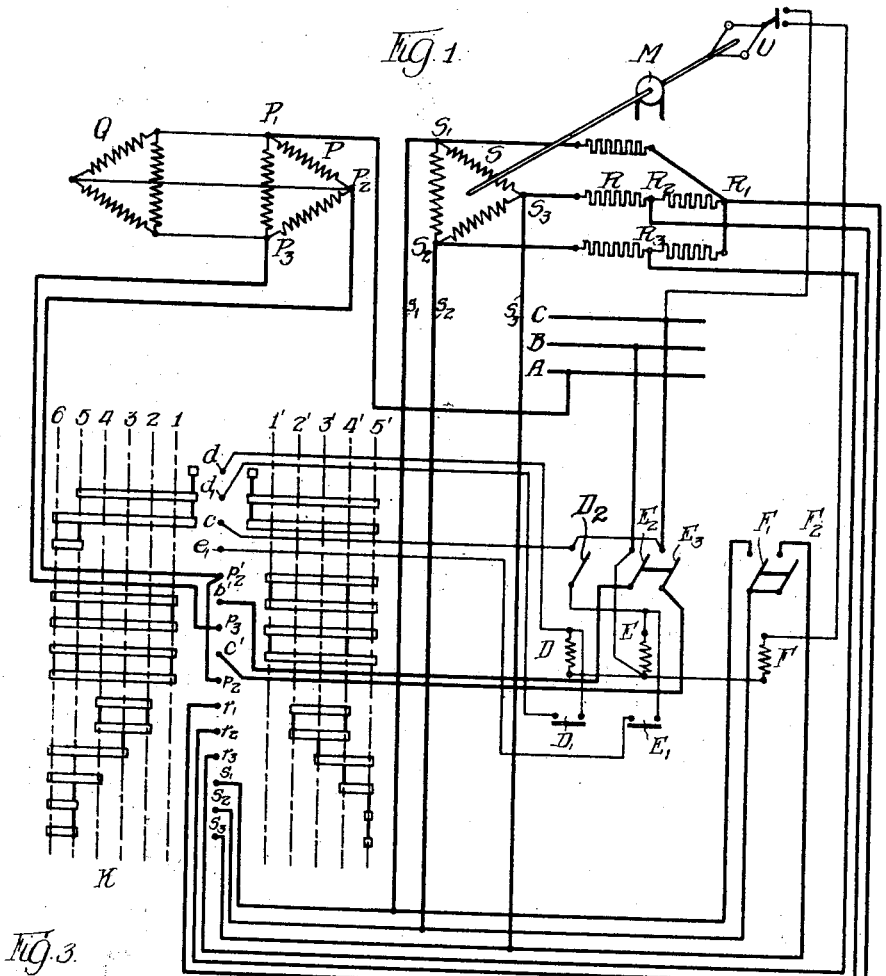
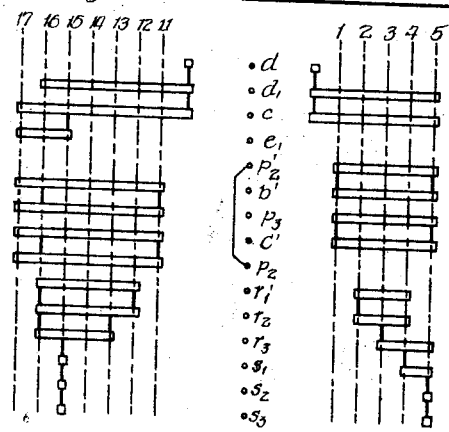
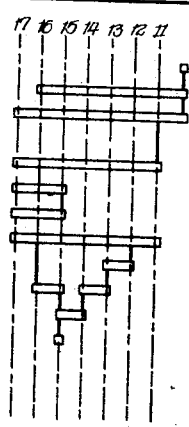
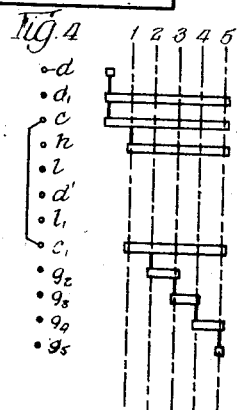
Witness:
R. Burkhardt
Inventor:
Ferdinand Angerstein,
By Cromwell ... attys

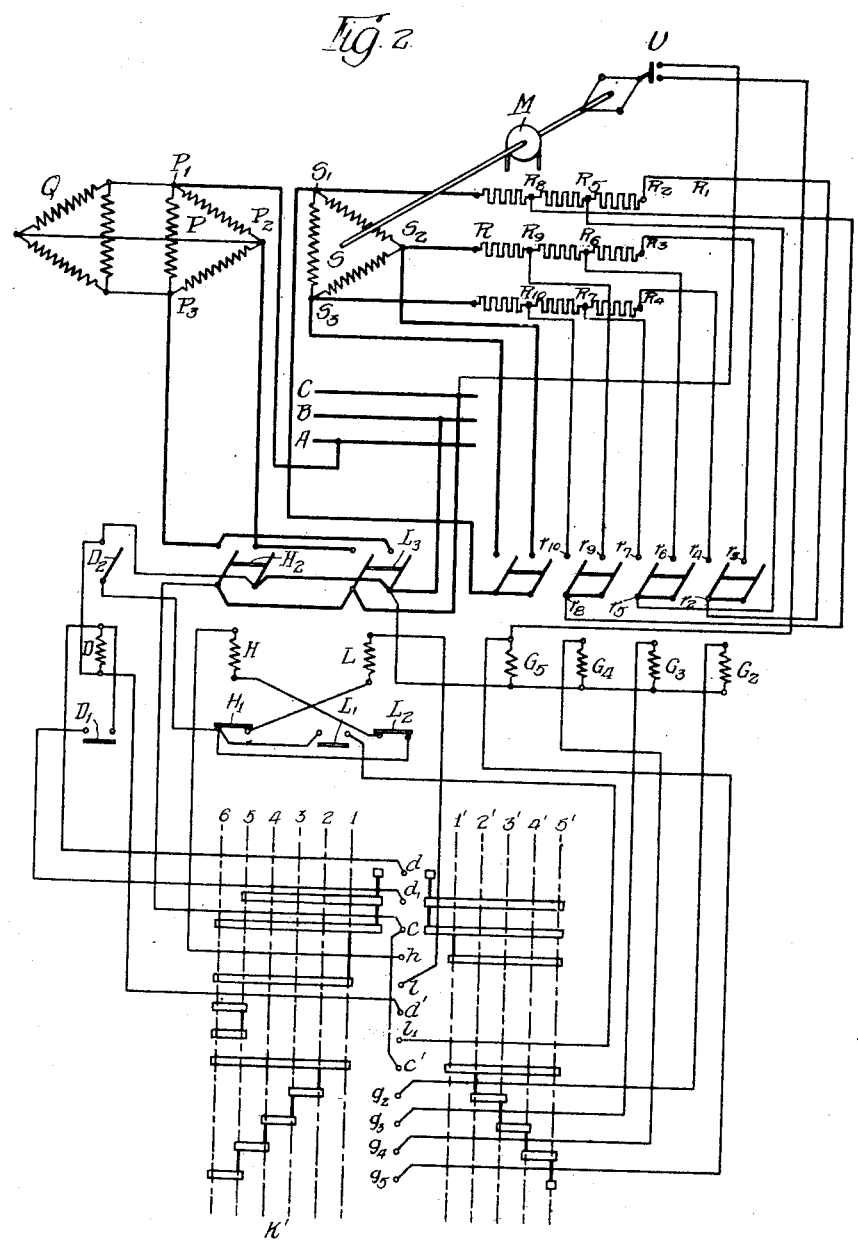

Patented May 26, 1931

1,807,143

UNITED STATES PATENT OFFICE

FERDINAND ANGERSTEIN, OF MANNHEIM, GERMANY, ASSIGNOR TO AKTIENGESELL-
SCHAFT BROWN BOVERI & CIE., OF BADEN, SWITZERLAND, A JOINT-STOCK COMPANY OF SWITZERLAND

INDUCTION-MOTOR CONTROL SYSTEM

Application filed April 14, 1927, Serial No. 183,656, and in Germany April 24, 1926.

This invention relates to induction-motor control systems, and it has particular relation to controllers for motors used in hoists, winders, railway vehicles and like services, wherein the motor is utilized to regeneratively return energy to the supply line during a part of the operation.

When an induction motor is regeneratively driven by a descending load, such as a hoist, the motor runs as an asynchronous generator somewhat above synchronism, returning energy to the supply line. Under such conditions the secondary winding of the induction motor must be short-circuited since a resistance in the secondary winding would cut down the energy generated by the machine, resulting in an excessive increase in speed of the descending load, the motor running considerably above synchronism.

With the controllers as heretofore used for such motor systems, difficulty was experienced when the controller, by means of which the resistance in the secondary winding of the induction motor is cut in and out, was returned from the position at which the descending load operated the motor regeneratively to the rest position at which the motor was stopped and the load brought to rest. In returning the control gear to the zero position, the prior-art controllers would reinsert resistance in the secondary winding of the motor, decreasing the counter torque opposing the descent of the load and thus, very often, producing an excessive increase in the speed of the load instead of arresting its movement.

Among the objects of the present invention is the provision of an improved controller, whereby the operator is enabled to return the control apparatus from the lowering position, at which regeneration takes place, to the zero position, at which the load movement is arrested, without introducing resistance into the secondary winding of the motor, thereby avoiding possibility of excessive rise in the load speed which constituted a serious defect in the prior-art motor systems.

The foregoing and other objects of the invention will be best understood from the following description of exemplifications thereof, reference being made to the accompanying drawings, wherein Fig. 1 is a diagrammatic view of an induction-motor control system embodying the invention;

Fig. 2 is a similar view embodying a modification of the invention; and

Figs. 3 and 4 are developed views of control drums employed in further modifications of the invention.

Fig. 1 of the drawings illustrates an induction-motor control system embodying the invention applied to an electric hoist or winder. Hoists of such type are described in an article published in the Brown Boveri Review, November, 1925, pages 233-237 inclusive. Such motor system comprises an induction motor having a stator provided with a primary winding P and a rotor provided with a secondary winding S. The windings are of the polyphase type and have three phase terminals, $P_1$, $P_2$, $P_3$, and $S_1$, $S_2$, $S_3$, respectively. The rotor is suitably coupled to a hoist M which may be provided with a brake that normally holds the load at rest, but which releases the load upon energizing a brake-lifting winding Q connected in parallel to the primary winding P. The motor is operated from a three-phase supply line A, B, C and may be connected, either for lowering or for hoisting, by means of a drum controller K having a zero or datum position 0, six lowering positions 1 to 6, and five hoisting positions 1' to 5'. The drum of the controller is shown in developed form, and comprises a plurality of contact fingers indicated by dots underneath the point corresponding to the zero position of the controller, and ring segments for establishing the various operating circuits for lowering or hoisting the motor.

The control system further comprises three contactor switches designated by the letters D, E and F, respectively applied to the operating coils of said switches. The contactor D has contacts $D_1$ and $D_2$ which are closed when the contactor is energized, and are opening when the contactor is de-energized. Contactor E has contacts $E_1$ and double-pole contacts $E_2$, $E_3$ which are closed when the contactor coil is energized and opened when the contactor coil is de-energized. Contactor F has double-pole contacts $F_1$, $F_2$ which are closed when the contactor is energized.

The resistor R connects the terminals $S_1$, $S_2$, $S_3$ of the secondary winding into a closed circuit, suitable conductors $s_1$, $s_2$, $s_3$ from said terminals, and conductors $r_1$, $r_2$, $r_3$ from said resistor, leading to contact fingers on the controller designated by the same letters as the respective conductors. The terminals of the contact members $F_1$, $F_2$ are connected in parallel to the contact fingers $s_1$, $s_2$, $s_3$ leading to the terminals of the secondary winding S for short-circuiting said winding by the contactor upon energizing thereof. A speed-responsive relay U is arranged to energize the contactor coil F when the speed of the rotor exceeds a predetermined value above synchronism.

One terminal $P_1$ of the primary winding is shown permanently connected to phase A of the supply line, the other two terminals $P_2$, $P_3$ of said winding being connected in either one or other sequence to the remaining two phases B, C of the supply line by means of contact fingers $p_2$, $p_2'$, $p_3$, $c'$, $b'$ on the controller and contacts $E_2$, $E_3$ on the contactor E.

The energizing of the operating coils of the two contactors D, E is controlled by means of contact fingers $c$, $d$, $d_1$, $e_1$ on said control drum.

By bringing the control drum into the various hoisting positions the motor is energized to raise the load, the speed of the motor being controlled by gradually short-circuiting the segments of the resistor R until the terminals $S_1$, $S_2$, $S_3$ are short-circuited in the end position $5'$ of the controller, as is well known in the art. The present invention is not concerned with the control mechanism, as far as it relates to the hoisting operations, and no further description of such mechanism will be given.

The lowering positions 1 to 6 of the controller serve to establish such connections between the motor windings and the line that excessive acceleration of the descending load is prevented without the use of mechanical or other energy-destroying braking means. This is particularly important in case of heavy loads where the energy dissipated in the brakes is considerable. In utilizing the induction motor to regeneratively brake the descending load, the primary windings of the motor are connected in opposite sequence than when the motor is used to raise the load, these connections being established by the left hand side segments of the controller co-operating with the contact fingers $b'$, $p_3$, $c'$, $p_2$. At the same time the secondary windings S of the motor are close-circuited first through the resistors R in order to prevent an inrush of current into the motor before the load is sufficiently accelerated to near synchronism. In the successive operating positions 1 to 5 of the controller the resistor R is gradually short-circuited. In the position 5, the three terminals $S_1$, $S_2$, $S_3$ of the secondary windings are directly short-circuited by the left hand side contact segments of the controller opposite the contact fingers $s_1$, $s_2$, $s_3$.

When moving the control drum from the zero position to the short-circuiting position 5, it is important that the controller shall be brought to the short-circuiting position in such short time as to prevent the load from becoming accelerated above synchronism while passing through the intermediate steps 2, 3, 4 of the controller. In other words, the movement of the controller from the zero position to the short-circuiting position 5 should be carried out in such way that the motor will not have time to accelerate under the negative load and attain full speed before the control lever has reached the short-circuiting position when all the secondary resistance has been cut out. Otherwise, the speed might rise to a value considerably in excess of synchronism and endanger the installation. However, the intermediate resistance steps 2 to 4 are required in order to limit the current flow into the motor during the short interval before the motor has been accelerated by the load to near synchronous speed.

On the other hand, when the load is to be stopped, the motor has to be returned from near synchronism to standstill. Under such conditions, insertion of the resistance into the secondary windings of the motor, when returning the control drum from the short-circuiting position 5 to the zero position, would cause the load to become accelerated and the motor to increase in speed considerably above synchronism, instead, as intended, to slow down the movement of the descending load and stop the same. With the prior-art controllers this rise in speed cannot be avoided, since the time required to return the control drum into zero position is sufficient to allow the speed to reach an excessively high value. This has been found to be a very serious drawback in the utilization of the induction motors for regeneratively braking descending loads.

In the control system embodying the invention, the advantages of the gradual cutting-out of the resistances in the secondary of the induction motor when bringing the same from rest to supersynchronous regenerative speed are retained, while at the same time avoiding the foregoing defects accompanying the gradual cutting-in of said resistances upon returning the control apparatus to the zero position. This is secured by causing the motor, under certain conditions, to be completely cut out as soon as the controller is moved back from the short-circuiting position to the zero position. In the preferred embodiment of the invention, the controller is so arranged that under certain conditions the return movement of the controller from the short-circuiting position to the zero position will cause the resistance to be gradually cut in in the same manner as in the prior-art arrangements described above; under certain other predetermined conditions the return movement of the controller will cause the motor to be de-energized and the brakes applied immediately after the controller leaves the short-circuiting position on its way back to the zero position.

It is to this end that the controller has, in addition to the short-circuiting position 5, a second short-circuiting position 6 which constitutes the next step of the controller movement. The control connections of the controller are so arranged that when the control drum is brought to the first short-circuiting position 5, return movement of the control drum will gradually cut in the resistances in the same way as they were cut out when the controller was going through the steps 2, 3 and 4 in the lowering movement thereof. However, if the control drum is brought to the second short-circuiting position 6, return movement of the controller will immediately cause the motor to become de-energized, and the brake to be applied, as soon as the control drum is about to leave the first short-circuiting position 5, without going through the steps of cutting in the resistance as in the case where the controller is returned without being brought to the second from the first short-circuiting position 5. This step control action is secured by means of the left hand segments on the control drum opposite the upper four contact fingers $d$, $d'$, $c$ and $e'$.

The operation of the new control system is as follows: If the load is to be lowered, the controller is moved from the zero position through the positions 1, 2, 3 and 4 to the short-circuiting position 5. In the first position of the control movement, a circuit is established from supply phase C by way of the contact finger $c$, then through the connections between the contact segments to the upper contact finger $d$, coil D and back to phase B. The contactor D picks up and closes the contacts $D_1$ and $D_2$. The contacts $D_1$ establish a locking circuit for holding the contactor in closed position as long as the control drum is moved between the positions 0 to 5. This locking circuit leads from the contact finger $c$, by way of the segment connections, to the contact finger $d'$, contacts $D_1$, coil D to the phase B.

The closure of the contacts $D_2$ establishes an energizing circuit for the operating coil of the second contactor E, this circuit leading from phase C through contacts $D_2$, coil E, back to phase B. The contactor E thereupon closes, short-circuiting the contacts $E_1$, and $E_2$, $E_3$, the latter establishing energizing connections from phases B and C to contact fingers $b'$, $c'$ on the controller.

As soon as the controller reaches position 1, the contact fingers $b'$, $p_3$, $c'$, $p_2$ and the cooperating drum segments establish connections between phases B and C and terminals $P_3$ and $P_2$ of the primary winding, thereby energizing the same and the parallel connected brake lifting windings Q which set the load free to be lowered. In the next position 2 of the controller, the primary winding connections remain unchanged, but contact fingers $r_1$, $r_2$ are short-circuited, cutting out one portion of the secondary resistance. In the next position 3 all three contact fingers $r_1$, $r_2$, $r_3$ are short-circuited, cutting out more of the secondary resistance. When the controller is finally brought into the short-circuiting position 5, which as pointed out above must happen before the load had opportunity to accelerate the motor materially above synchronism, the secondary winding terminals $S_1$, $S_2$, $S_3$ are completely short-circuited by the contact segments cooperating with the contact fingers $s_1$, $s_2$, $s_3$. In this position the descent of the load is effectively braked by the regenerative action of the motor.

As soon as the controller reaches the first short-circuiting position 5, the contact segment opposite the contact finger $e_1$ establishes a locking circuit for the operating coil of the second contactor E, this circuit leading from phase C, contact finger $c$, contact finger $e_1$, the closed contacts $E_1$, through coil E back to phase B.

If the drum is only moved to the first short-circuiting position 5, the return of the drum will establish the same circuits as the forward movement of the drum, but in reverse sequence, the resistor R being gradually reinserted into the secondary winding. If, however, the drum is moved to the second short-circuiting position 6, the circuit through the contact finger $d_1$ is broken, thereby opening the locking circuit of the first contactor D and de-energizing the same. However, the second contactor E is still held locked by the short segment opposite the contact finger $e_1$, continuing to hold the motor energized in the short-circuiting position in which the load is regeneratively braked.

If, now, the control drum is returned from the second short-circuiting position, the back movement to the first short-circuiting position fails to reclose the first contactor D, since its locking circuit has been broken at the contacts $D_1$. In the further back movement, as soon as the control drum leaves the short-circuiting position 5, the locking circuit for the second contactor E is interrupted by the segment cooperating with the contact finger $e_1$, releasing the second contactor E and thereby immediately opening the contacts $E_2$, $E_3$ through which the primary winding P and the brake-lifting winding Q was being held energized. Accordingly, the brake will immediately be applied, and the load will come to rest without giving the motor an opportunity to become dangerously accelerated while the control drum is moving through the resistance cut-in steps 4, 3, 2, 1 to 0. In order to insure against the possibility of a heavy descending load excessively increasing the speed of the motor by reason of trouble in the controller or carelessness of an operator, a centrifugally operated protective relay $u$ is arranged to directly short-circuit the secondary winding of the motor if the rotor speed exceeds a predetermined value. The relay $u$ is suitably actuated by the motor and when the rotor exceeds the safe speed limit, usually somewhat above synchronism, the relay closes, establishing the circuit from phase C through the relay contact, coil F, back to phase B. The contactor F thereupon closes and the contact pairs $F_1$ and $F_2$ short-circuit the secondary winding S, thereby securing full regenerative braking action.

With a control system as described above, the operator of a hoist, or like load, has opportunity to decide whether the load is of such character, as to weight, etc., as to permit regulation of the descending speed by means of the intermediate steps 1 to 4 on the control drum. If he finds such speed regulation is desirable, he will turn the control drum only to the first short-circuiting position 5, thus making it possible to regulate the speed by returning the control drum to the resistance positions 2 to 4.

However, if he finds that the load is heavy and that the control of the descending speed is impossible, he simply moves the control drum to the second short-circuiting position 6. He may thereupon readily stop the load without danger of increasing the load speed, while going through the intermediate control positions of the drum by merely moving the control drum back of position 5, as explained above. The short-circuiting positions 5 and 6 of the controller may be given various characteristics so that one or the other position shall be more or less accentuated when reached by the operator. For instance, the first short-circuiting position 5 may be strongly registered, as by means of the usual star wheel, so that under ordinary circumstances the controller would not be moved beyond the first short-circuiting position 5, and a relatively appreciable force would be required to bring the control drum into the second short-circuiting position. Alternatively, if heavy loads are mostly dealt with, the first short-circuiting position 5 may be either entirely dispensed with or only slightly registered so that the return movement of the control drum will normally cause complete de-energizing of the motor in braking thereof.

The control system shown in Fig. 2 is in every respect similar to that of Fig. 1, except that the main circuit connections from the supply phases A, B, C to the primary winding P of the motor and the close-circuiting connections of the secondary winding S and the secondary resistors R are not effected by contact fingers and segments on the control drum, but by means of contactors H, L, $G_2$, $G_3$, $G_4$, and $G_5$. The energization of the foregoing contactors is, however, controlled by the control drum K' to establish the various circuit connections in the same sequence as the control drum K in the arrangement of Fig. 1, an additional contactor D, corresponding in function to the similar contactor in the arrangement of Fig. 1, serving to establish the control connections whereby the motor is completely cut out when the control drum is returned from the second short-circuit position.

In the arrangement of Fig. 2, contactor H is closed when the control drum is moved to the hoisting positions 1' to 5' and the contactor L is closed when the control drum is moved to the lowering positions 1 to 6, connecting the primary winding P to the line phases A, B, C in either one or another sequence, respectively.

The lowering contactor L has two pairs of lower contacts $L_1$ and $L_2$ and two pairs of upper contacts $L_3$. The upper contacts establish the connections from the primary winding terminals $P_1$, $P_2$ to the line phases B and C. Closure of the contactor closes one pair of the contacts $L_1$ and opens the second pair of contacts $L_2$, the latter serving to interrupt the energizing circuit of the hoisting contactor H. Closure of the contactors $G_2$, $G_3$, $G_4$, $G_5$ gradually cuts out the secondary resistors R of the secondary winding of the motor, the line contactor $G_5$ directly short-circuiting the terminals $S_1$, $S_2$, $S_3$ of said winding.

When the control drum is moved towards the first position to lower a load, the control drum establishes an energizing circuit for the first contactor D, said energizing circuit leading from phase C through contact finger $c'$ opposite the front contact segment, through the intersegment connection to the contact finger $d$, coil D, back to phase B. Contactor D closes, establishing for itself a locking circuit through the contacts $D_1$ and contact finger $d_1$. In position 1 of the control drum, the lowering contactor is energized through a circuit leading from phase C through contactor finger $c$, contact segments, to contact finger 1, coil L, contacts $H_1$, contacts $D_2$ back to phase B. Contactor L closes, and establishes the lowering circuit connections to the primary winding P.

In the course of the further movement of the control drum through positions 2, 3 and 4, the resistance cut-out contactors $G_2$, $G_3$, $G_4$ close the respective contactors and gradually decrease the resistance in the secondary of the motor. When the control drum reaches the first short-circuiting position 5, the actuating coil of the short-circuiting contactor $G_5$ is energized, closing the contactor and short-circuiting the secondary winding for full regenerative braking. The short-circuiting contactor may be directly energized by means of a centrifugal speed responsive protective relay $u$, to independently short-circuit the secondary winding of the motor in case the rotor exceeds a predetermined value, as explained in connection with Fig. 1.

Return movement of the controller from position 5 will cause the individual resistor sections to be cut in in opposite sequence in a way analogous to the controller described in Fig. 1.

As soon as the control drum reaches the position 5, a locking circuit for lowering contactor L is established through contact fingers $d$, $l_1$, and the cooperating segment portions, the locking circuit leading from phase B past the open contact pair $D_2$, past the coil D to contact fingers $d$, then through the segment connection to the contact finger $l_1$, contacts $L_1$, contacts $H_1$, through coil L to contact finger $l$, through the segment connections, contact finger $c$, back to phase C.

If the control drum is brought to the second short-circuiting position 6, the locking circuit for the first contactor D is opened and return movement of the control drum beyond the short-circuiting position 5 will immediately de-energize the lowering contactor L, opening the locking circuit of said contactor at the contact fingers $d$ and $l_1$. As a result, as in the case of the control system shown in Fig. 1, the motor will immediately be disconnected from the line and the load movement will be arrested by the brake.

The control systems utilizing control drums such as shown in Figs. 3 and 4 are in every respect analogous to those of the control systems shown in Figs. 1 and 2, respectively, except that the control drums have, in addition to the lowering positions in which resistance is cut out when moving the control drum from the zero position to the short-circuiting position, further positions beyond the short-circuiting position, in which resistance is again inserted in the rotor circuit in order to enable convenient lowering of loads at above synchronous speeds. In the control drums there are shown five lowering positions 11 to 15 corresponding to the lowering positions 1 to 5 of the controllers illustrated in Figs. 1 and 2; in addition, the controllers in Figs. 3 and 4 having two further control positions 16 and 17 lying beyond the short-circuiting position 15. When the drum is moved to the further positions 16 and 17, resistance is reinserted in the rotor circuit to increase the speed of the descending load.

As in case of the controllers in Figs. 1 and 2, movement of the control drum beyond the short-circuiting position establishes such control circuit connections that, on return of the control drum, the motor is immediately de-energized, and the brakes applied to the load, as soon as the control drum goes back of the short-circuiting position 15. However, if the control drum in its forward movement is brought only into the short-circuiting position 15, back movement of the control drum will reinsert the rotor resistance step by step as explained above. The foregoing arrangement thus removes a very serious defect of controllers wherein high-speed lowering steps are provided beyond the short-circuiting position but which do not embody the motor-cut-out provisions of the present invention. In such prior-art controllers without the cut-out arrangement, return movement of the controller from the high-speed lowering positions, such as 17 in Figs. 3 and 4, will, at first, reduce the speed as the controller is brought to the short-circuiting position of the motor, but further movement of the controller to the zero position again reinserts resistance producing an increase in the load speed, and endangering the installation. The improved cut-out device of the invention entirely removes this drawback while retaining all the advantages of prior art systems.

My invention is not limited to the specific embodiments thereof described hereinabove, but is susceptible of various modifications, such as the substitution of other switching means for the contactors, the drums, etc., and I, accordingly, desire that the appended claims be given a broad construction commensurate with the invention.

I claim:

1. In a control system comprising a motor having primary and secondary windings, an alternating-current line, primary switching means for connecting the primary windings to said line, a plurality of resistor elements close-circuiting said secondary winding, and a load, a control apparatus having an initial position at which said motor is disconnected from the line, and an operating position at which the resistor elements in the secondary winding of the motor are short-circuited and the primary windings are so connected to said line that said load rotates said motor to regeneratively return energy to said line, said control apparatus passing through a plurality of control steps in which said resistor elements are gradually cut out when bringing said control apparatus from the starting position to the short-circuiting and regenerating position, the control apparatus having a first short-circuiting position and a second short-circuiting position, said positions establishing equivalent braking connections for said load, and means rendered effective upon movement of said apparatus to the second short-circuiting position for causing opening operation of said primary switching means in response to backward movement of the controller.

2. In a motor system comprising an induction motor having primary and secondary windings, an alternating-current line, primary switching means for connecting said line to said primary winding, resistor elements close-circuiting said secondary winding, secondary switching means for short-circuiting said resistor elements, and a load connected to said motor, a control apparatus comprising a contral member movable from a datum position at which said motor is disconnected from said line to a short-circuiting position at which said secondary winding is short-circuited and said primary winding is connected to said line to regeneratively brake the movement of said motor, said control apparatus having a plurality of control steps between said zero position and said short-circuiting position to gradually short-circuit said resistor elements, the return movement of said control member from said short-circuiting position normally causing said resistor elements to be reinserted, and means rendered effective upon movement of said control member to a predetermined position beyond said short-circuiting position for causing opening operation of said primary switching means in response to return movement of said control member from said short-circuiting position.

In testimony whereof I have hereunto subscribed my name this 24 day of March, A. D. 1927, at Stuttgart Germany.

FERDINAND ANGERSTEIN.